(12) United States Patent
Nakano et al.

(10) Patent No.: US 10,780,495 B2
(45) Date of Patent: Sep. 22, 2020

(54) GAS-RECYCLING DEVICE, ADDITIVE MANUFACTURING APPARATUS, AND ADDITIVE MANUFACTURING METHOD

(71) Applicant: Kabushiki Kaisha Toshiba, Minato-ku (JP)

(72) Inventors: Hideshi Nakano, Yokosuka (JP); Hiroshi Ohno, Yokohama (JP); Morihiro Machida, Chuo (JP); Aya Watase, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 499 days.

(21) Appl. No.: 15/552,857

(22) PCT Filed: Sep. 10, 2015

(86) PCT No.: PCT/JP2015/075770
§ 371 (c)(1),
(2) Date: Aug. 23, 2017

(87) PCT Pub. No.: WO2016/147443
PCT Pub. Date: Sep. 22, 2016

(65) Prior Publication Data
US 2018/0029122 A1 Feb. 1, 2018

(30) Foreign Application Priority Data

Mar. 18, 2015 (JP) .................. 2015-055082

(51) Int. Cl.
*B01D 47/06* (2006.01)
*B33Y 30/00* (2015.01)
(Continued)

(52) U.S. Cl.
CPC ............ *B22F 3/1007* (2013.01); *B01D 47/06* (2013.01); *B01D 53/02* (2013.01);
(Continued)

(58) Field of Classification Search
CPC ........ B01D 46/18; B01D 47/06; B01D 47/00; B01F 3/04; B01F 3/04021; B01F 3/04049; B33Y 30/00
See application file for complete search history.

(56) References Cited

U.S. PATENT DOCUMENTS 2,028,713 A * 1/1936 Bartholomew ......... C01B 17/58
423/540
3,631,656 A * 1/1972 Hausberg .................. F28C 1/02
96/356
(Continued)

FOREIGN PATENT DOCUMENTS

JP 47-13236 B1 4/1972
JP 50-91872 A 7/1975
(Continued)

OTHER PUBLICATIONS

International Search Report dated Dec. 22, 2015, in PCT/JP2015/075770, filed Sep. 10, 2015.

*Primary Examiner* — Robert A Hopkins
(74) *Attorney, Agent, or Firm* — Oblon, McClelland, Maier & Neustadt, L.L.P.

(57) ABSTRACT

A gas-recycling device according to an embodiment includes a particle remover, a liquid remover, and a supplier. The particle remover brings a mist of liquid into contact with a gas which includes particles and is discharged from an apparatus, to remove the particles from the gas. The liquid remover removes the liquid from the gas having passed through the particle remover. The supplier supplies the gas to the apparatus.

13 Claims, 8 Drawing Sheets

(51) Int. Cl.
  *B01F 3/04* (2006.01)
  *B22F 3/10* (2006.01)
  *B33Y 10/00* (2015.01)
  *B29C 64/35* (2017.01)
  *B33Y 40/00* (2020.01)
  *B01D 53/02* (2006.01)
  *B22F 3/105* (2006.01)
  B29C 64/153 (2017.01)
  B01D 53/04 (2006.01)
  B01D 53/26 (2006.01)

(52) U.S. Cl.
  CPC ........ *B01F 3/04049* (2013.01); *B22F 3/1055* (2013.01); *B29C 64/35* (2017.08); *B33Y 10/00* (2014.12); *B33Y 30/00* (2014.12); *B33Y 40/00* (2014.12); *B01D 53/04* (2013.01); *B01D 53/261* (2013.01); *B01D 2256/10* (2013.01); *B01D 2257/104* (2013.01); *B01D 2257/80* (2013.01); *B22F 2003/1059* (2013.01); *B22F 2999/00* (2013.01); *B29C 64/153* (2017.08); *Y02P 10/24* (2015.11); *Y02P 10/295* (2015.11)

(56) References Cited

U.S. PATENT DOCUMENTS

| | | | | |
|---|---|---|---|---|
| 3,675,393 | A * | 7/1972 | Meade | B01D 46/18 95/214 |
| 3,749,377 | A * | 7/1973 | Slater | B01D 47/06 261/78.2 |
| 4,352,718 | A * | 10/1982 | Grun | F26B 3/08 159/4.01 |
| 6,168,646 | B1 * | 1/2001 | Craig | B01D 46/0086 95/14 |
| 6,333,003 | B1 | 12/2001 | Katano et al. | |
| 6,632,269 | B1 * | 10/2003 | Najm | B01D 46/0023 55/351 |
| 7,186,290 | B2 * | 3/2007 | Sheehan | B01D 46/0028 95/277 |
| 7,785,382 | B2 * | 8/2010 | Morton | F24C 15/2035 55/332 |
| 9,375,669 | B2 * | 6/2016 | Spiegel | B01D 46/22 |
| 10,385,746 | B2 * | 8/2019 | Zhang | B01D 46/0063 |
| 10,675,854 | B2 * | 6/2020 | Van Hassel | B01D 47/00 |
| 2002/0110511 | A1 * | 8/2002 | Klingspor | B01D 53/18 423/243.08 |
| 2004/0069703 | A1 * | 4/2004 | Wanni | B01D 29/09 210/400 |
| 2010/0044547 | A1 | 2/2010 | Higashi et al. | |
| 2011/0089122 | A1 * | 4/2011 | Smith | B01D 33/745 210/774 |
| 2014/0034580 | A1 * | 2/2014 | Chen | B01D 36/003 210/708 |
| 2016/0303502 | A1 * | 10/2016 | Higgins | B01D 47/06 |

FOREIGN PATENT DOCUMENTS

| | | |
|---|---|---|
| JP | 52-120470 A | 10/1977 |
| JP | 56-129818 U | 10/1981 |
| JP | 57-131224 A | 8/1982 |
| JP | 60-55611 A | 3/1985 |
| JP | 62-22025 U | 2/1987 |
| JP | 62-101372 A | 5/1987 |
| JP | 63-32625 U | 3/1988 |
| JP | 63-270521 A | 11/1988 |
| JP | 2-30433 A | 1/1990 |
| JP | 5-137929 A | 6/1993 |
| JP | 7-66140 A | 3/1995 |
| JP | 9-173755 A | 7/1997 |
| JP | 10-216419 A | 8/1998 |
| JP | 11-40497 A | 2/1999 |
| JP | 2000-329382 A | 11/2000 |
| JP | 2002-57133 A | 2/2002 |
| JP | 2006-7124 A | 1/2006 |
| JP | 2006-124732 A | 5/2006 |
| JP | 2010-47813 A | 3/2010 |
| JP | 2010-265530 A | 11/2010 |

* cited by examiner

GAS-RECYCLING DEVICE, ADDITIVE MANUFACTURING APPARATUS, AND ADDITIVE MANUFACTURING METHOD

CROSS REFERENCE TO RELATED APPLICATION

This application is a U.S. national phase application under 35 U.S.C. § 371 of PCT/JP2015/075770, filed on Sep. 10, 2015, which designates the U.S. and claims the benefit of priority under 35 U.S.C. § 119 from prior Japanese Application No. 2015-055082, filed on Mar. 18, 2015, the entire contents of each of which are incorporated herein by reference.

FIELD

Embodiments described herein relate generally to a gas-recycling device, an additive manufacturing apparatus, and an additive manufacturing method.

BACKGROUND

There are, for example, known apparatuses for manufacturing or processing objects by melting or sintering metal materials. An inert gas used in such apparatuses may contain particles such as metal fumes. The metal fumes may be removed from the inert gas for reuse.

According to one embodiment, a gas-recycling device includes a particle remover, a liquid remover, and a supplier. The particle remover brings a mist of liquid into contact with a gas which includes particles and is discharged from an apparatus to remove the particles from the gas. The liquid remover removes the liquid from the gas having passed through the particle remover. The supplier supplies the gas to the apparatus.

DETAILED DESCRIPTION

Hereinafter, a first embodiment will be described with reference to FIGS. 1 and 2. In the present specification, basically, a vertical upward direction is defined as all upward direction and a vertical downward direction is defined his a downward direction. Constituent elements according to embodiments may be represented differently and may be described differently. Other expressions than those described herein and other descriptions thereof should not be precluded. Further, other expressions of constituent elements not given different expressions and their different descriptions should not be precluded.

Figure 1:
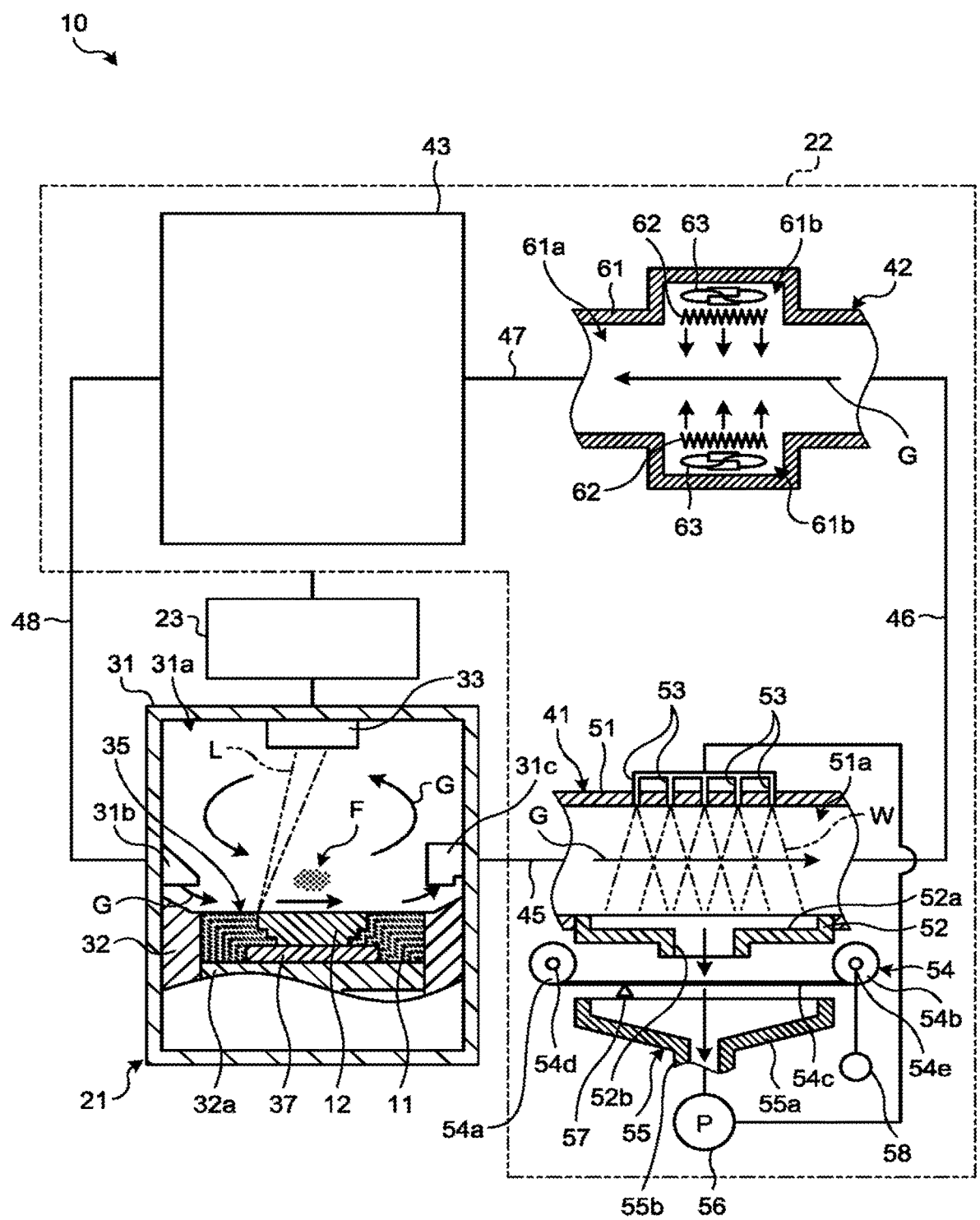
FIG. 1 is a schematic cross-sectional view of a three-dimensional printer according to a first embodiment.

FIG. 1 is a schematic cross-sectional view of a three-dimensional printer 10 according to a first embodiment. The three-dimensional printer 10 is an example of an additive manufacturing apparatus. The three-dimensional printer 10 additively manufactures a three-dimensional object 12 from a powdery material 11. Additive manufacturing can also be referred to as AM.

The material 11 is a material of the object 12 and is, for example, powder of metal such as iron. The material 11 is not limited thereto and may be resin powder or other materials. The three-dimensional printer 10 may manufacture the object 12 from different binds of materials 11.

As illustrated in FIG. 1, the three-dimensional printer 10 includes a manufacturing unit 21, a fume collecting unit 22 indicated by a two-dotted chain line, and a control unit 23. The manufacturing unit 21 is an example of an apparatus and a manufacturing unit and may also be referred to as, for example, a processing unit and a processing area. The fume collecting unit 22 is an example of a gas-recycling device and may also be referred to as, for example, a collector, a remover, and a purifier.

The manufacturing unit 21 manufactures the object 12 from the material 11. The manufacturing unit 21 includes a treatment tank 31, a manufacturing tank 32, and an optical device 33. Further, the manufacturing unit 21 includes, for example, various components including a material tank (not illustrated) which stores the material 11 and a squeegee (not illustrated) for supplying the material 11 from the material tank to the manufacturing tank 32.

The treatment tank 31 has, for example, a sealable box shape. A treatment chamber 31a is provided inside the treatment tank 31. The treatment chamber 31a may also be referred to as, for example, a processing chamber, a chamber, and an area. The treatment chamber 31a accommodates the manufacturing tank 32, the optical device 33, the material tank, and the squeegee.

The treatment chamber 31a of the treatment tank 31 is provided with an outlet 31b and an inlet 31c. The outlet 31b and the inlet 31c are both connected to the fume collecting unit 22. The fume collecting unit 22 supplies a nitrogen gas G from the outlet 31b to the treatment chamber 31a. The nitrogen gas G is an example of a gas and an inert gas. The gas and the inert gas are not limited thereto and may be, for example, other gases such as helium and argon. The fume collecting unit 22 suctions the nitrogen gas G from the treatment chamber 31a through the inlet 31c. FIG. 1 schematically illustrates a flow of the nitrogen gas G by art arrow, but the flow and position of the nitrogen gas G are not limited to the ones in FIG. 1.

The outlet 31b and the inlet 31c are directed toward a manufacturing area 35 formed in the manufacturing tank 32. The manufacturing area 35 is formed of, for example, layers of the material 11. The nitrogen gas G supplied from the outlet 31b forms a nitrogen gas atmosphere at least in the vicinity of the manufacturing area 35. The nitrogen gas atmosphere is an example of inert gas atmosphere.

The nitrogen gas G is suctioned from the inlet 31c into the fume collecting unit 22, passing the vicinity of the manufacturing area 35. The nitrogen gas G is not limited thereto and may be circulated in the treatment chamber 31a, for example, as indicated by the arrow of FIG. 1.

Layers of the material 11 are formed in the manufacturing tank 32 and the object 12 of a three-dimensional shape is formed from the layers of the material 11 in the manufacturing tank 32. Through repeated layering and solidifying the material 11, the object 12 is manufactured inside the manufacturing tank 32. The manufacturing tank 32 includes a stage 32a.

A base plate 37 is placed and fixed onto the stage 32a to deposit the material 11 thereon. The object 12 is formed on the base plate 37. Alternatively, the object 12 may be directly formed on the stage 32a without the base plate 37.

The stage 32a can foe moved in vertical direction by various devices such as a hydraulic elevator. Along with the motion of the stage 32a, the material 11, the object 12, and the base plate 37 on the stage 32a move upward and downward.

The material tank is provided near the manufacturing tank 32. For example, when the stage 32a of the manufacturing tank 32 moves down by an amount corresponding to one layer, the material 11 in the material tank rises and a layer of the material 11 appears from the material tank. The squeegee presses the material 11 on the material tank toward the manufacturing tank 32 for supply. Thereby, a layer of the material 11 is formed in the manufacturing tank 32. In other words, the material 11 are additively layered in the manufacturing tank 32. The layering method of the material 11 is not limited thereto.

The optical device 33 includes an optical system including a light source (not illustrated) with an oscillating element to emit a laser beam L, a scanner (not illustrated) such as a Galvano mirror for scanning the laser beam L, and a condenser lens (f-θ lens) (not illustrated) which collects the laser beam scanned by the scanner onto an image plane.

The optical device 33 is located above the manufacturing tank 32. In the optical device 33 the laser beam L emitted from the light source is converted into parallel light by a conversion lens. The laser beam L is reflected by the Galvano mirror whose inclination angle is changeable, and collected by the condenser lens. Thereby, the optical device 33 emits the laser beam L to a desired position.

The control unit 23 is electrically connected to the manufacturing unit 21 and the fume collecting unit 22. The control unit 23 includes, for example, various electronic components such as CPU, ROM, and RAM. The control unit 23 controls the manufacturing unit 21 and the fume collecting unit 22 by reading and executing a program stored in the ROM or another storage device. The manufacturing unit 21 manufactures the object 12 under the control (the program) of the control unit 23 in the following manner, for example.

First, the control unit 23 receives three-dimensional data of the object 12 from, for example, an external personal computer. The three-dimensional data is, for example, CAD data, but may be different kinds of data.

The control unit 23 generates cross-sectional data sets from the three-dimensional data of the object 12. For example, the control unit 23 generates cross-sectional shape data for each layer by dividing the three-dimensional shape of the object 12 into layers by a predetermined thickness.

Next, the stage 32a of the manufacturing tank 32 moves down by one layer and the material tank raises one layer of the material 11. The squeegee flattens one layer of the material 11 on the material tank along the manufacturing tank 32, to form a layer of the material 11 on the stage 32a of the manufacturing tank 32. The layers of the material 11 form the manufacturing area 35.

The control unit 23 controls the optical device 33 to irradiate the manufacturing area 35 with the laser beam L. The control unit 23 sets the irradiation position of the laser beam L based on the generated cross-sectional data.

By the irradiation of the laser beam L in the nitrogen gas atmosphere, a part of the layer of the material 11 irradiated, with the laser beam L is melted. The optical device 33 partially melts and solidifies the material 11 by irradiating the material 11 with the laser beam L. Thereby, the layer of the material 11 is formed into one layer of the object 12. Alternatively, the material 11 may be sintered.

Upon completion of the emission of the laser beam L from the optical device 33, the three-dimensional printer 10 repeatedly forms and melts the layers of the material 11, as described above. Thus, the three-dimensional printer 10 manufactures the three-dimensional object 12.

In the description above, the object 12 is formed by melting the layered material 11 with the laser beam L. However, the object 12 is not limited thereto and may be formed by supplying melted material 11, for example.

The material 11 may be evaporated through the melting and sintering with the laser beam L. The evaporated material 11 is aggregated to form the fume F. The fume F is an example of particles and may also be referred to as, for example, fine particles, powder, fine dust, dust, and impurities. The fume F becomes raised with the nitrogen gas G in the treatment chamber 31a. The nitrogen gas G including the fume F in the treatment chamber 31a is suctioned from the inlet 31c info the fume collecting unit 23.

The fume collecting unit 22 includes a mist area 41, a dry area 42, and a nitrogen generation area 43. The mist area 41 is an example of a particle remover and may also be referred to as a collector, a purifier, a capturer, and a trap, for example. The dry area 42 is an example of a liquid remover and may also be referred to as a dryer, an evaporator, a volatilizer, and a vaporizer, for example. The nitrogen generation area 43 is an example of a supplier and may also be referred to as a gas remover and a refiner.

The fume collecting unit 22 further includes a first conduit 45, a second conduit 46, a third conduit 47, and a fourth conduit 48. The first conduit 45 connects the manufacturing unit 21 and the mist area 41 to each other. The second conduit 46 connects the mist area 41 and the dry area 42 to each other. The third conduit 45 connects the dry area 42 and the nitrogen generation area 43 to each other. The fourth conduit 48 connects the nitrogen generation area 43 and the manufacturing unit 21 to each other.

FIG. 1 schematically illustrates the arrangement of the manufacturing unit 21, the mist area 41, the dry area 42, and the nitrogen generation area 43 for description. The positions and the sizes of the manufacturing unit 21, the rust area 41, the dry area 42, and the nitrogen generation area 43 are not limited to the positions and the sizes illustrated in FIG. 1. For example, the manufacturing unit 21, the mist area 41, the dry area 42, and the nitrogen generation area 43 are disposed substantially at the same height. Further, the manufacturing unit 21 is larger in size than each of the mist area 41 and the dry area 42.

The nitrogen gas G is discharged from the inlet 31c of the manufacturing unit 21 to the mist area 41 through the first conduit 45. The mist area 41 includes a first wall 51, a receiver 52, nozzles 53, a filter 54, a collector 55, a pump 56, a detector 57, and a conveyer 58. Each of the nozzle 53 is an example of an injector and may also be referred to as a mist generator and a spray, for example. The filter 54 may also be referred to as, for example, a capturer, a collector, and a trap. The pump 56 is an example of a liquid supplier.

The first wall 51 has, for example, a substantially rectangular parallelepiped box shape. The shape of the first wall 51 is not limited thereto and may be, for example, another shape such as a cylindrical shape. A first passage 51a runs inside the first wall 51. The first passage 51a is an example of a passage.

The first passage 51a is a part of a passage from one end of the fume collecting unit 22 connected to the inlet 31c of the manufacturing unit 21 to the other end of the fume collecting unit 22 connected to the outlet 31b of the manufacturing unit 21. One end of the first passage 51a is connected to the first conduit 45. The other end of the first passage 51a is connected to the second conduit 46. As indicated by the arrow of FIG. 1, suctioned from the inlet 31c of the manufacturing unit 21, the nitrogen gas G flows from one end to the other end of the first passage 51a.

The receiver 52 is provided in the first wall 51. The receiver 52 is provided with a concave 52a and a vent 52b. The vent 52b is an example of a discharger. For example, the concave 52a is recessed from the bottom part of the inner surface of the first passage 51a to the outside of the first wall 51. For example, the vent 52b is provided about the center of the concave 52a and open to the outside of the first wall 51. The position of the vent 52b is not limited thereto.

The nozzles 53 are provided on the first wall 51, opposing the concave 52a of the receiver 52. For example, the nozzles 53 are disposed in a matrix form on the first wall 51 located at the ripper position. The positioning of the nozzles 53 is not limited thereto.

The nozzles 53 open into the first passage 51a and inject a mist of pure water W to the concave 52a of the receiver 52. The pure water W is an example of a liquid. Thus, the mist of the pure water W is formed between the receiver 52 and the first wall 51 with the nozzles 53 in the first passage 51a.

The nitrogen gas G including the fume F passes through the mist of the pure water W in the first passage 51a. The mist area 41 contains a mix of the misty pure water W and the nitrogen gas G including the fume F discharged from the treatment chamber 31a of the manufacturing unit 21. The nitrogen gas G including the fume F contacts the mist of pure water W.

In the mist area 41, the fume F in the nitrogen gas G is adsorbed by the particles of the mist of the pure water W formed in the first passage 51a. As described above, the mist of pure water W is injected from the nozzles 53 toward the concave 52a of the receiver 52. Further, the particles of the mist of pure water W adsorb the fume F and increase in weight. For this reason, the particles of the mist of pure water W fly downward to the concave 52a of the receiver 52 while adsorbing the fume F. The particles of the mist of pure water W may fly in other directions.

The particles of the pure water W including the fume F adhere onto the concave 52a of the receiver 52. The particles of the pure water W are aggregated in the concave 52a. The aggregated pure water W including the fume F in the concave 52a is discharged from the vent 52b. Thus, the mist area 41 separates the pure water W including the fume F from the nitrogen gas G. In other words, the mist area 41 works for allowing the pure water W to absorb the fume F from the nitrogen gas G for removal.

The filter 54 is, for example, a strip filter made of paper. The filter 54 may be formed of other materials into other shapes as long as it can capture the fume F. The filter 54 includes a first part 54a, a second part 54b, and a third part 54c.

The first part 54a is, for example, wound around a first rotatable shaft 54d. The first part 54a includes one end of the filter 54. One end of the filter 54 is attached, to the first shaft 54d.

The second part 54b is, for example, is wound around a second rotatable shaft 54e. The second part 54b includes the other end of the filter 54. The other end of the filter 54 is attached to the second shaft 54e.

The third part 54c is located between the first part 54a and the second part 54b. The third part 54c extends substantially horizontally. The third part 54c is not limited thereto. The third part 54c faces the vent 52b of the receiver 52.

Discharged from the vent 52b of the receiver 52, the pure water W including the fume F passes through the third part 54c of the filter 54 facing the vent 52b. The fume F in the pure water W is captured by the third part 54c of the filter 54.

The collector 55 includes a collecting part 55a and a collection pipe 55b. The collecting part 55a has, for example, a funnel shape and collects the pure water W having passed the filter 54. The collection pipe 55b is connected to the collecting part 55a to introduce the pure water W collected by the collecting part 55a into the pump 56.

The pump 56 supplies the pure water W collected by the collection unit 55 to the nozzles 53. Thus, the nozzles 53 inject the pure water W collected by the collection unit 55 to the first passage 51a again. The pump 56 is not limited thereto and may be supplied with the pure water W from outside for supply to the nozzles 53.

The detector 57 is a sensor which senses the weight of the third part 54c of the filter 54. For example, the detector 57 transmits a signal to the control unit 23 in accordance with the weight or deflection of the third part 54c. Thereby, the control unit 23 measures the weight of the third part 54c.

The conveyer 58 is, for example, a motor attached to the second shaft 54e. The third part 54c of the filter 54 increases in weight while capturing the fume F. The control unit 23 drives the conveyer 58 when the weight of the third part 54c exceeds a threshold value. The conveyer 58 rotates the second shaft 54e, to convey the filter 54 from the first part 54a to the second part 54b. In other words, the conveyer 58 conveys the filter 54 from the first part 54a to the second part 54b in line with the weight of the third part 54c.

A part of the filter 54 forms the third part 54c. The part of the filter 54 having captured a predetermined amount of the fume F is conveyed to the second part 54b. At the same time, a part of the first part 54a of the filter 54 is unreeled as a new third part 54c. That is, the conveyer 53 renews the third part 54c.

When a predetermined length of the filter 54 captures the fume F and is rewound about the second shaft 54e, the control unit 23 outputs, for example, a text or a sound for requesting the user of the three-dimensional printer 10 to replace the filter 54. For example, the control unit 23 determines a replacement timing of the filter 54 from the weight of the second shaft 54e or the rotation amounts of the first and second shafts 54d and 54e measured with sensors. In the embodiment, since the filter 54 is formed of paper, the replaced old filter 54 can be discarded by, for example, incineration.

The nitrogen gas G from which the fume F is removed in the mist area 41 is sent to the dry area 42 through the second conduit 46. The dry area 42 includes a second wall 61, heaters 62, and fans 63. Each of the heaters 62 is an example of a heater.

The second wall 61 has, for example, a substantially rectangular parallelepiped box shape. The shape of the second wall 61 is not limited thereto and may be, for example, other shapes such as a cylindrical shape. A second passage 61a and compartments 61b are formed inside the second wall portion 61.

The second passage 61a is a part of the passage from one end of the fume collecting unit 22 connected to the inlet 31c of the manufacturing unit 21 to the other end of the fume collecting unit. 22 connected to the outlet 31b of the manufacturing unit 21. One end of the second passage 61a is connected to the second conduit 46. The other end of the second passage 61a is connected to the third conduit 47. As indicated by the arrow of FIG. 1, the nitrogen gas G flows from one end to the other end of the second passage 61a.

The compartments 61b are respectively recessed from the inner surfaces of the second passage 61a toward the outside of the second wall 61. The heaters 62 and the fans 63 are respectively accommodated in the compartments 61b.

The heaters 62 generate heat by, for example, electrical resistance. The heaters 62 are not limited thereto and may be other heat generators. The heaters 62 can generate heat at, for example, a temperature higher than the boiling point of the pure water W.

The fans 63 are further spaced apart from the second passage 61a than the heaters 62 are, for example. The fans 63 face the heaters 62. In other words, the heaters 62 are located between the second passage 61a and the fans 63.

The fans 63 generate a flow of a gas to the second passage 61a. In other words, the fans 63 generate a flow of a gas in a direction intersecting the flow of the nitrogen gas G in the second passage 61a.

The dry area 42 is air-tightly sealed with respect to the outside of the three-dimensional printer 10. Because of this, the fans 63 cause the nitrogen gas G to flow. The arrangement of the fans 63 is not limited thereto and may be arranged, for example, along the flow of the nitrogen gas G.

The flow of the nitrogen gas G generated by the fans 63 flows into the second passage 61a through the heaters 62. That is, the fans 63 blow warm nitrogen gas G to the second passage 61a. Flowing through the second passage 61a, the nitrogen gas G is dried by the warm nitrogen gas G.

The nitrogen gas G having passed the mist area 41 may still contain the mist of pure water W. Thus, the nitrogen gas G flowing into the dry area 42 may contain the particles of the pure water W. The fans 63 blow the warm nitrogen gas G to the nitrogen gas G including the pure water W to evaporate the pure water W. In other words, the pure water W in the nitrogen gas G is evaporated by the heat from the heater 62. Thereby, the liquid pure water W is removed from the nitrogen gas G having passed the mist area 41. For example, the evaporated vapor (the pure water W) returns to the mist area 41 to be condensed, or is removed in the next nitrogen generation area 43.

Having the liquid pure water W removed in the dry area 42, the nitrogen gas G is delivered to the nitrogen generation area 43 through the third conduit 47. The nitrogen generation area 43 removes a gas other than nitrogen from the nitrogen gas G having passed the dry area 42. The gas other than nitrogen is an example of a gas having a component different from that of the gas.

The nitrogen gas G may contain an oxygen gas generated from the pure water W. The nitrogen gas G may also contain vapor generated from the pure water W. The nitrogen generation area 43 adsorbs and removes the oxygen gas or the water vapor from the nitrogen gas G.

The nitrogen generation area 43 supplies the nitrogen gas G excluding the gas other than nitrogen from the outlet 31b of the manufacturing unit 21 to the treatment chamber 31a through the fourth conduit 48. As described above, the nitrogen gas G supplied to the treatment chamber 31a forms a nitrogen gas atmosphere. Thus, the nitrogen gas G, which forms the nitrogen gas atmosphere in the treatment chamber 31a of the manufacturing unit 21, has the fume F removed therefrom in the fume collecting unit 22, and is returned to the treatment chamber 31a.

Figure 2:
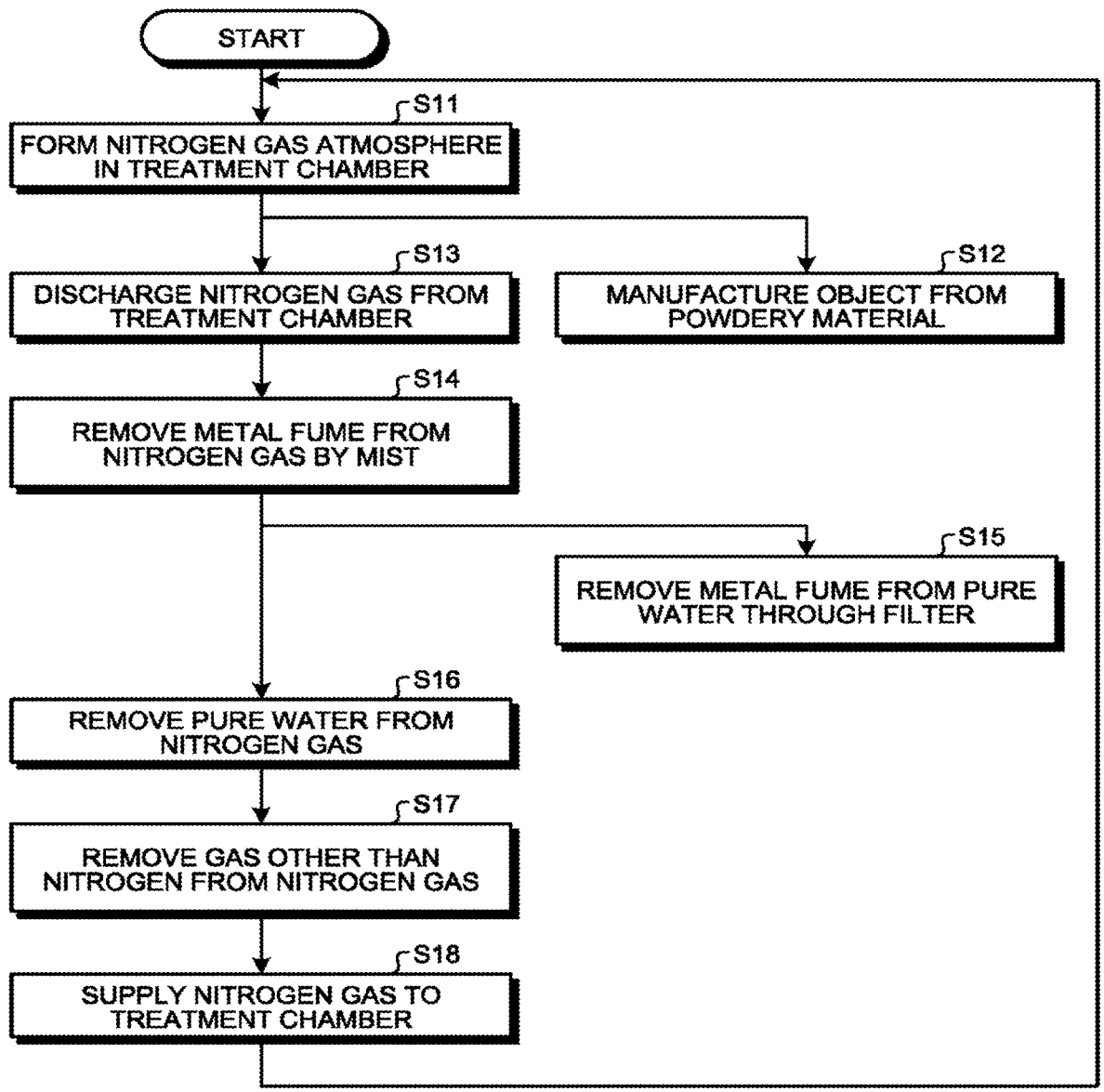
FIG. 2 is a schematic flowchart of an example of an additive manufacturing method using the three-dimensional printer according to the first embodiment.

FIG. 2 is a schematic flowchart of an example of an additive manufacturing method using the three-dimensional printer 10 of the first embodiment. Hereinafter, an example of the additive manufacturing method using the three-dimensional printer 10 will be described with reference to FIG. 2. The additive manufacturing method using the three-dimensional printer 10 is not limited to the following method and other methods may be adopted.

First, the nitrogen gas G supplied from the fume collecting unit 22 forms the nitrogen gas atmosphere in the treatment chamber 31a of the manufacturing unit 21 (S11). The nitrogen gas G may be first supplied from, for example, a nitrogen gas cylinder to the treatment chamber 31a. Upon the formation of the nitrogen gas atmosphere, the manufacturing unit 21 adds layer-upon-layer of the powdery material 11 in the treatment chamber 31a. The manufacturing unit 21 melts or sinters the material 11 under the nitrogen gas atmosphere of the treatment chamber 31a to manufacture the object 12 (S12).

While the manufacturing unit 21 manufactures the object 12, for example, the fume collecting unit 22 suctions the nitrogen gas G from the inlet 31c. Thereby, the nitrogen gas G including the fume F is discharged from the treatment chamber 31a of the manufacturing unit 21 (S13). The nitrogen gas G discharged from the treatment chamber 31a is brought into contact with the mist of pure water W in the mist area 41. The fume F is adsorbed into the mist of pure water W and the pure water W including the fume F is separated from the nitrogen gas G. Accordingly, the fume F is removed from the nitrogen gas G (S14).

The pure water W including the fume F passes through the filter 54. The fume F in the pure water W is removed by the filter 54 (S15). The pure water W filtered through the filter 54 is supplied to the nozzles 53 by the pump 56.

Meanwhile, the nitrogen gas G having contacted the mist of pure water W in the mist area 41 is dried in the dry area 42. This removes the liquid pure water W from the nitrogen gas G (S16).

The nitrogen gas G excluding the liquid pure water W has a gas other than nitrogen removed in the nitrogen generation area 43 (S17). The nitrogen generation area 43 supplies the nitrogen gas G from the outlet 31b of the manufacturing unit 21 to the treatment chamber 31a again (S18).

By repeating the above-described steps (S11) to (S18), the fume F is removed from the nitrogen gas G in the treatment chamber 31a of the manufacturing unit 21. The three-dimensional printer 10 manufactures the object 12 by melting or sintering the material 11 under the nitrogen gas atmosphere with no fume F.

In the three-dimensional printer 10 according to the first embodiment, the mist area 41 works for bringing the nitrogen gas G including the fume F discharged from the manufacturing unit 21 into contact with the mist of pure water W and removing the pure water W including the fume F from the nitrogen gas G. The remaining pure water W in the nitrogen gas G having passed the mist area 41 is removed in the dry area 42. The fume-removed and dried nitrogen gas G can be supplied to the manufacturing unit 21 for reuse. This makes it possible to ensure the removal of the fume F from the nitrogen gas G and to decrease the frequency of the filter maintenance including cleaning and replacement, compared to, for example, the removal of the fume F from the nitrogen gas G through the filter. Due to the decrease in the frequency of the maintenance, a continuous operation time of the fume collecting unit 22 can be extended. Further, it is possible to reduce power consumption, compared to, for example, the removal of the fume F from the nitrogen gas G through an electrostatic filter.

The nozzles 53 inject the mist of pure water W to the receiver 52. The filter 54 captures the fume F from the pure water W adhering to the receiver 52. Thereby, the fume F, removed from the nitrogen gas G by the pure water W, can be easily captured.

The receiver 52 is provided with the vent 52b from which the collected pure water W is discharged. The pure water W discharged from the vent 52b passes through the filter 54. Thereby, it is possible to easily remove the fume F from the pure water W by the filter 54.

The conveyer 58 conveys the filter 54 from the first part 54a to the second part 54b in accordance with the weight of the third part 54c so as to renew the third, part 54c through which the pure water W discharged from the vent 52b has passed. This can automatically renew the third part 54c in accordance with the amount, of the fume F captured through the third part 54c of the filter 54, reducing the frequency of the maintenance of the filter 54 including cleaning and replacement.

The pump 56 supplies the pure water W filtered through the filter 54 to the nozzles 53. The nozzles 53 repeatedly inject the supplied pure water W. This can decrease the frequency of the maintenance such as replenishment of the pure water W.

The heaters 62 heat the pure water W included in the nitrogen gas G. This evaporates the pure water W from the nitrogen gas G, to remove the liquid pure water W from the nitrogen gas G without fail, and inhibits the supply of the nitrogen G including the liquid pure water W to the manufacturing unit 21. The liquid pure water W may be removed by, for example, an ultrasonic wave or a desiccant instead of the heaters 62.

The nitrogen generation area 43 removes, from the nitrogen gas G, a gas having a different component from that of the nitrogen gas G. Thus, the nitrogen generation area 43 inhibits the supply of the mixed gas in the nitrogen gas G from the mist area 41 or the dry area 42 to the manufacturing unit 21. This leads to, for example, inhibiting occurrence of soot in the treatment chamber 31a due to the emission of the laser beam L to a gas containing carbon or inhibiting the oxidization of the material 11 and the object 12 due to the emission of the laser beam L to the vapor. The nitrogen generation area 43 of the first embodiment removes the gas other than the nitrogen gas G, however, when the three-dimensional printer 10 uses another inert gas, it removes a gas other than the inert gas.

Hereinafter, a second embodiment will be described with reference to FIG. 3. In the following embodiments, the same or like reference numerals are assigned to elements having the same functions as the above-described elements and a description thereof may be omitted. The elements denoted by the same or like reference numerals do not necessarily have common functions and properties and may have different functions and properties according to the embodiments.

Figure 3:
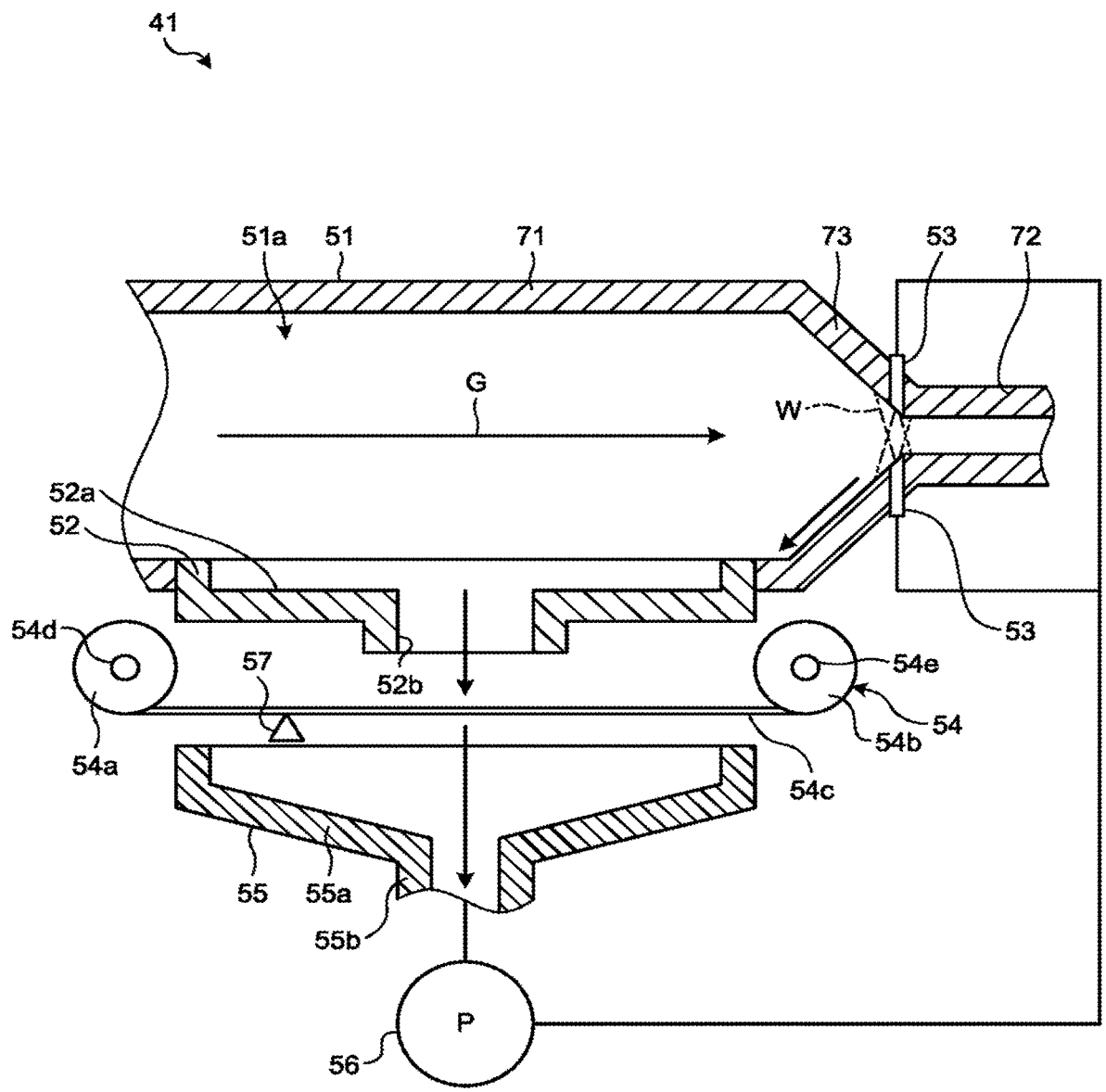
FIG. 3 is a cross-sectional view of a part of a mist area according to a second embodiment.

FIG. 3 is a cross-sectional view of a part of the mist area 41 according to the second embodiment. As illustrated in FIG. 3, the first wall 51 includes a first duct 71, a second duct 72, and a converger 73.

The first duct 71, the second duct 72, and the converger 73 respectively form a part of the first passage 51a. Each of the first duct 71 and the second duct 72 has, for example, a rectangular cylindrical shape. The shapes of the first duct 71 and the second duct 72 are not limited thereto and may be, for example, other shapes such as a cylindrical shape. The first duct 71 is connected to the first conduit 45. The second duct 72 is connected to the second conduit 46. The converger 73 lies between the first duct 71 and the second duct 72.

The cross-sectional area of the first passage 51a in the second duct portion 72 is smaller than the cross-sectional area of the first passage 51a in the first duct portion 71. The cross-sectional, area of the first passage 51a decreases in the direction from the first duct 71 to the second duct 72 in the converger 73.

The nozzles 53 are provided in, for example, the converger 73. The nozzles 53 are disposed to surround the first passage 51a in the converger 73. For example, the nozzle 53 on the top side opens downward, the nozzle 53 on the bottom side opens upward, the nozzle 53 on the left side opens rightward, and the nozzle 53 on the right side opens leftward. That is, the nozzles 53 inject the mist of pure waiter W to the first passage 51a from multiple directions.

The nitrogen gas G including the fume F is converged through the converger 73. The nozzles 53 inject the mist of pure water W to the converged nitrogen gas G in the converger 73 from multiple directions. Thereby, the mist area 41 brings the mist, of pure water W into contact with the nitrogen gas G including the fume F discharged from the treatment chamber 31a of the manufacturing unit 21.

The fume F in the nitrogen gas G is adsorbed into the particles of the mist of pure water W. The mist of pure water W flies toward the inner surface of the converger 73 while adsorbing the fume F. The particles of the pure wafer W including the fume F adhere to and become condensed on the inner surface of the converger 73.

The receiver 52 is provided in the first duct 71. While being condensed in the converger 73, the pure water W flows into the concave 52a of the receiver 52 along the inner surface of the converger 73. The pure water W including the fume F is discharged from the vent 52b and is filtered through the filter 54.

In the three-dimensional printer 10 of the second embodiment, the nozzles 53 inject the mist of pure water W from, multiple directions to the converged nitrogen gas G in the converger 73. Thereby, even with a decrease in the number of the nozzles 53, it is possible to further ensure the removal of the fume F from the nitrogen gas G.

Figure 4:
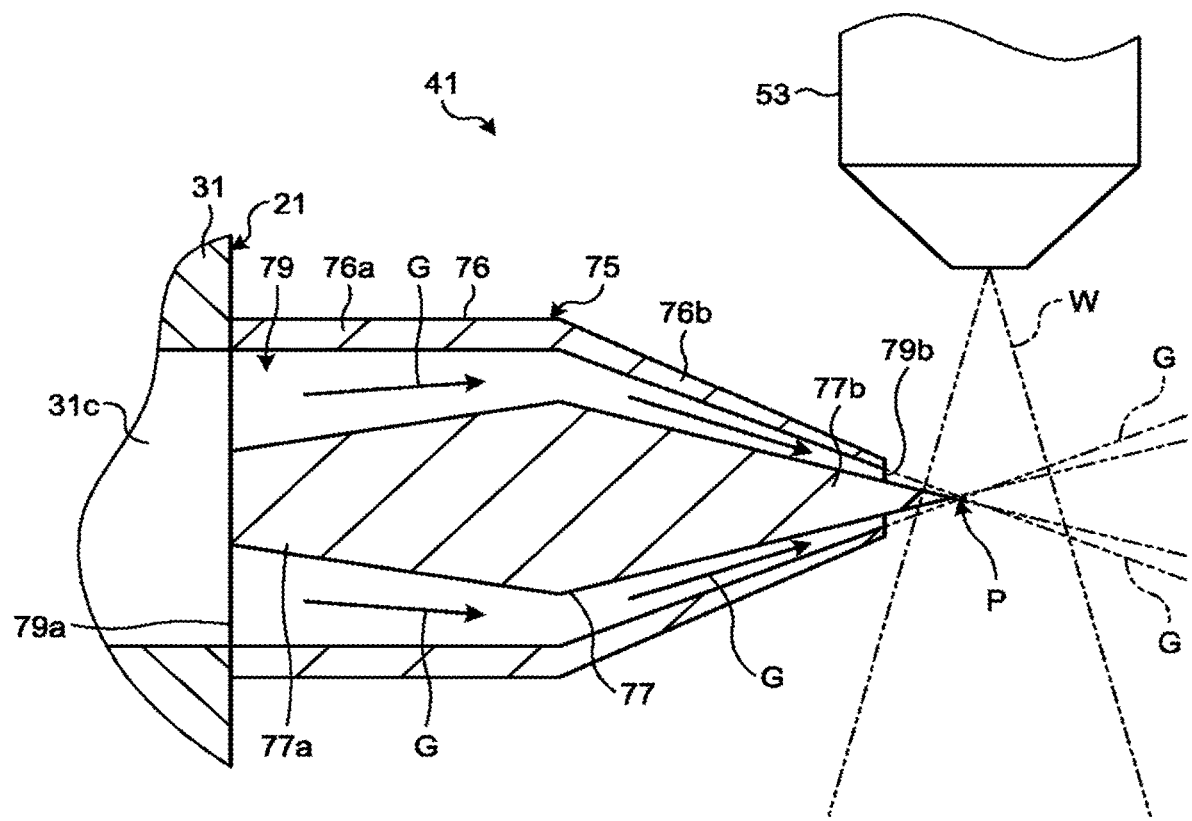
FIG. 4 is a cross-sectional view of a part of a mist area according to a third embodiment.

Hereinafter, a third embodiment will be described with reference to FIGS. 4 and 5. FIG. 4 is a cross-sectional view of a part of the mist area 41 according to the third embodiment. As illustrated in FIG. 4, the mist area 41 of the third embodiment includes a discharge nozzle 75.

The mist area 41 of the third embodiment is connected to the manufacturing unit 21 without the first conduit 45. Alternatively, the mist area 41 may be connected to the manufacturing unit 21 through another element such as the first conduit 45.

The discharge nozzle 75 is connected to the inlet 31c of the manufacturing unit 21. Thus, the nitrogen gas G suctioned to the treatment chamber 31a from the inlet 31c passes through the discharge nozzle 75. The discharge nozzle 75 includes an outer part 76 and an inner part 77.

Figure 5:
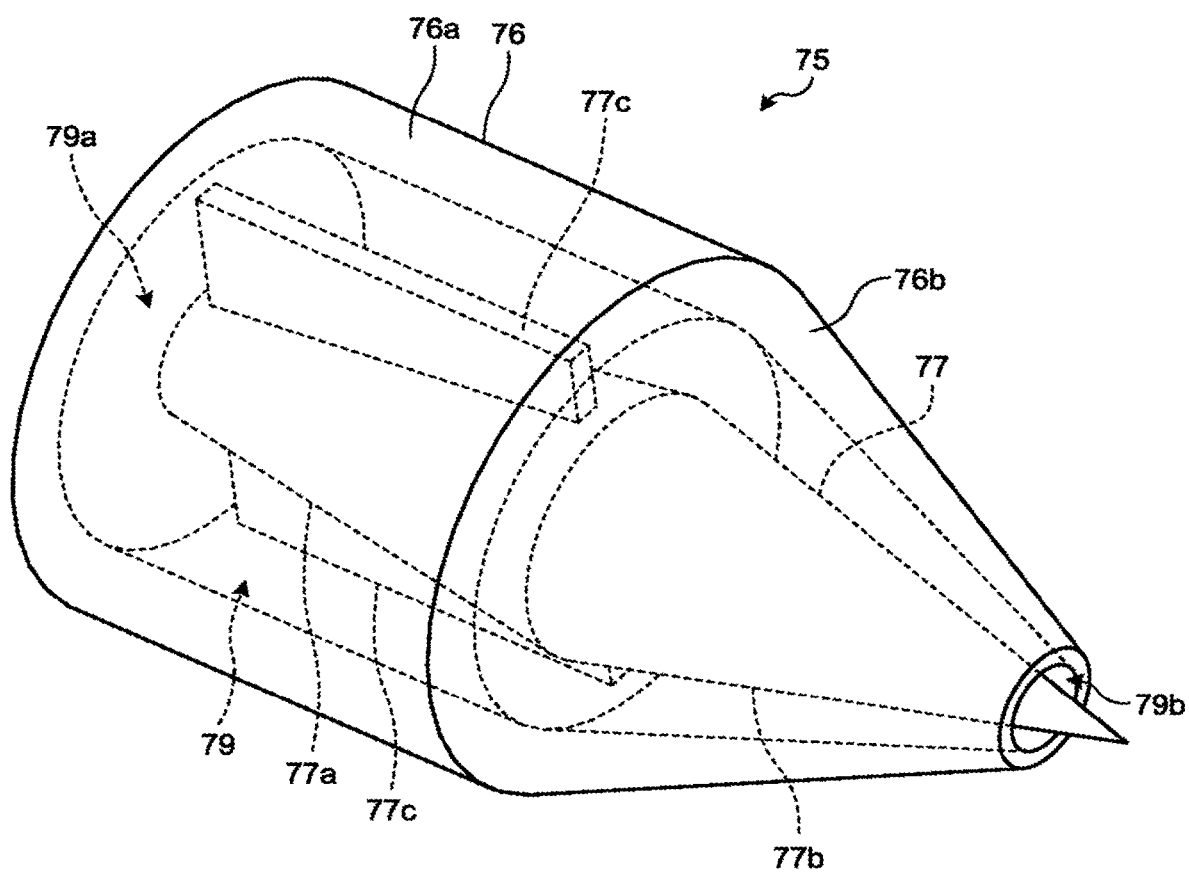
FIG. 5 is a perspective view of a discharge nozzle of the third embodiment.

FIG. 5 is a perspective view of the discharge nozzle 75 of the third embodiment. As illustrated in FIGS. 4 and 5, the outer part 76 includes a first outer wall 76a and a second outer wall 76b. The first outer wall 76a has a substantially cylindrical shape. The second outer wall 76b is continuous from the first outer wall 76a and has a tapered cylindrical shape which decreases in outer and inner diameters as going away from the first outer wall 76a. The end of the first outer wall 76a and the end of the second outer wall 76b are open.

The inner part 77 includes a first core 77a, a second core 77b, and connectors 77c illustrated in FIG. 5. The first core 77a is disposed inside the first outer wall 76a away from the inner surface of the first outer wall 76a. The first core 77a has a truncated conical shape that increases in cross-sectional area as it goes away from the open end of the first outer wall 76a. The second core 77b is disposed inside the second outer wall 76b away from the inner surface of the second outer wall 76b. The second core 77b is continuous from the first core 77a and has a conical shape that decreases in cross-sectional area as it goes away from the first core 77a. The front end of the second core 77b protrudes from the open end of the second outer wall 76b. However, the front end of the second core 77b may not protrude from the end of the second outer wall 76b.

As illustrated in FIG. 5, the connectors 77c protrude from the first core 77a in the radial direction of the inner part 77, The connectors 77c connect the first outer wall 76a and the first core 77a to each other. The connectors 77c are arranged in rotational symmetry with respect to the axis of the discharge nozzle 75. In the present embodiment, the multiple connectors 77c are provided, but only one connector 77c may be provided if the inner part 77 can be fixed to the outer part 76. With the multiple connectors 77c provided, the arrangement of the connectors 77c is not limited to the rotational symmetry.

As illustrated in FIG. 4, a convergence passage 79 is formed between the outer part 76 and the inner part 77. The convergence passage 79 has a shape which decreases in cross-sectional area as it goes away from the manufacturing unit 21. In the convergence passage 79 the cross-sectional area of a first end 79a connected to the manufacturing unit 21 is larger than the cross-sectional area of a second end 79b opposite the first end 79a. The shape of the convergence passage 79 is not limited thereto.

The nitrogen gas G, discharged from the inlet 31c of the manufacturing unit 21, is discharged through the convergence passage 79 of the discharge nozzle 75 from the second end 79b of the convergence passage 79 to the outside of the discharge nozzle 75. FIG. 4 illustrates the nitrogen gas G by an arrow and a two-dotted chain line. As illustrated in FIG. 4, discharged from the second end 79b of the convergence passage 79, the nitrogen gas G gathers at a convergence point P in the vicinity of the front end of the second core 77b and flows, spreading from the convergence point P. The convergence point P is an example of a position where a gas having passed through the convergence passage gathers. In this way, the convergence passage 79 converges the flow of the nitrogen gas G on the convergence point P.

In the mist area 41 of the third embodiment, the nozzles 53 are disposed to inject the mist of pure water W so that the mist of pure water passes the convergence point P. In other words, the nozzles 53 inject the mist of pure water W to an area including the convergence point P. For this reason, the nitrogen gas G discharged from the discharge nozzle 75 passes through the mist of pure water W injected from the nozzle 53. The fume F in the nitrogen gas G is adsorbed to the particles of the pure water W.

The pure water W having adsorbed the fume F is aggregated in the receiver 52 and Is discharged to the filter 54 as in, for example, the first embodiment. Thereby, the pure water W including the fume F is separated from the nitrogen gas G. Alternatively, the mist area 41 may remove the pure water W including the fume F from the nitrogen gas G by other methods.

In the three-dimensional printer 10 of the third embodiment, the nozzles 53 inject the mist of pure water W to the area including the convergence point P at which the nitrogen gas G having passed through the convergence passage 79 gathers. Thereby, the nitrogen gas G including the fume F more accurately contacts the mist of pure water W, making it possible to more accurately remove the fume F from the nitrogen gas G even with a less number of the nozzles 53.

The connectors 77c are arranged in rotational symmetry with respect to the axis of the discharge nozzle 75. This can more uniformly gather the flow of the nitrogen gas G at the convergence point P even when the flow of the nitrogen gas G is divided by the connectors 77c through the convergence passage 79.

The convergence passage 73 has the shape that decreases in cross-sectional area as it goes away from the manufacturing unit 21. This can compress the discharged nitrogen gas G from the inlet 31c of the manufacturing unit 21 and improve the straight travel of the nitrogen gas G when discharged from the second end 79b of the convergence passage 79. Thus, the flow of the nitrogen gas G can gather at the convergence point P.

The front end of the second core 77b of the inner part 77 protrudes from the open end of the second outer wall 76b. That is, the front end of the second core 77b protrudes from the second end 79b of the convergence passage 79. Accordingly, the discharged nitrogen gas G from the second end 79b of the convergence passage 79 can flow as a laminar flow along the front end of the second core 77b. Thereby, the flow of the nitrogen gas G can gather at the convergence point P.

Figure 6:
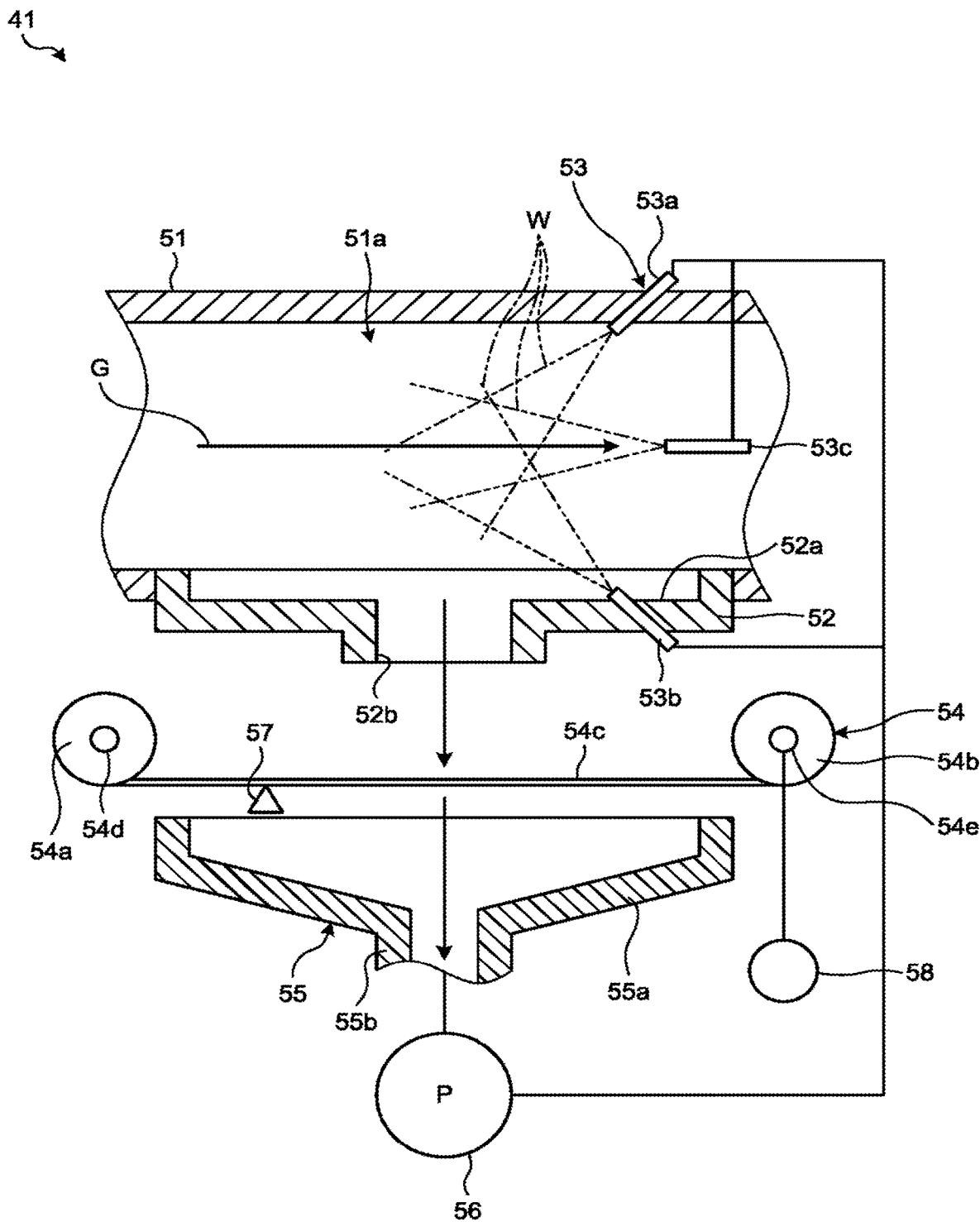
FIG. 6 is a cross-sectional view of a part of a mist area according to a fourth embodiment.

Hereinafter, a fourth embodiment will be described with reference to FIG. 6. FIG. 6 is a cross-sectional view of a part of the mist area 41 according to the fourth embodiment. As illustrated in FIG. 6, the nozzles 53 of the fourth embodiment include a first nozzle 53a, a second nozzle 53b, and a third nozzle 53c.

The first nozzle 53a is provided in the first wall 51 facing the receiver 52. The first nozzle 53a may be disposed at a shifted position from the position facing the receiver 52 or other positions.

The first nozzle 53a injects the mist of pure water W in a direction inclined to the upstream of the flow of the nitrogen gas G from a direction orthogonal to the flow of the nitrogen gas G in the first passage 51a. The upstream of the flow of the nitrogen gas G is directed from the first passage 51a toward the inlet 31c of the manufacturing unit 21. In other words, the first nozzle 53a injects the mist, of pure water W obliquely downward, that is, to the upstream side of the first passage 51a.

The second nozzle 53b is provided in the receiver 52. Thus, the positions of the nozzles 53 are not limited to those on the first wall 51. The second nozzle 53b is not limited thereto and may be provided in the first wall 51 provided with the receiver 52 or other parts.

The second nozzle 53b injects the mist of pure water W in a direction inclined to the upstream of the flow of the nitrogen gas G from a direction orthogonal to the flow of the nitrogen gas G in the first passage 51a. In other words, the second nozzle 53b injects the mist of pure water W obliquely upward, that is, to the upstream side of the first passage 51a.

The third nozzle 53c is provided substantially on the axis of the first passage 51a. The third nozzle 53c is supported substantially on the axis of the first passage 51a by, for example, a beam which extends from the first wall 51 or the receiver 52. The third nozzle 53c may be disposed at other positions. The third nozzle 53c is connected to the pump 56 together with the first and second nozzles 53a and 53b and is supplied with the pure water W from the pump 56.

The third nozzle 53c injects the mist of pure water W toward the upstream of the flow of the nitrogen gas G in the first passage 51a. In other words, the third nozzle 53c injects the mist of pure water W oppositely to the flow of the nitrogen gas G in the first passage 51a.

In the three-dimensional printer 10 of the fourth embodiment, the first to third nozzles 53a to 53c inject the mist of pure water W toward the upstream of the flow of the nitrogen gas G in the first passage 51a. In other words, the first to third nozzles 53a to 53c inject the mist of pure water W to the upstream of the flow of the nitrogen gas G rather than in the direction orthogonal to the flow of the nitrogen gas G. This increase a volume of the mist of pure water W contacting the nitrogen gas G, and the mist of pure water W can more accurately contact the nitrogen gas G including the fume F to more accurately remove the fume F from the nitrogen gas G. In other words, the mist of pure water W contacts the nitrogen gas G including the fume F in a larger space, more surely remove the fume F from the nitrogen gas G.

Figure 7:
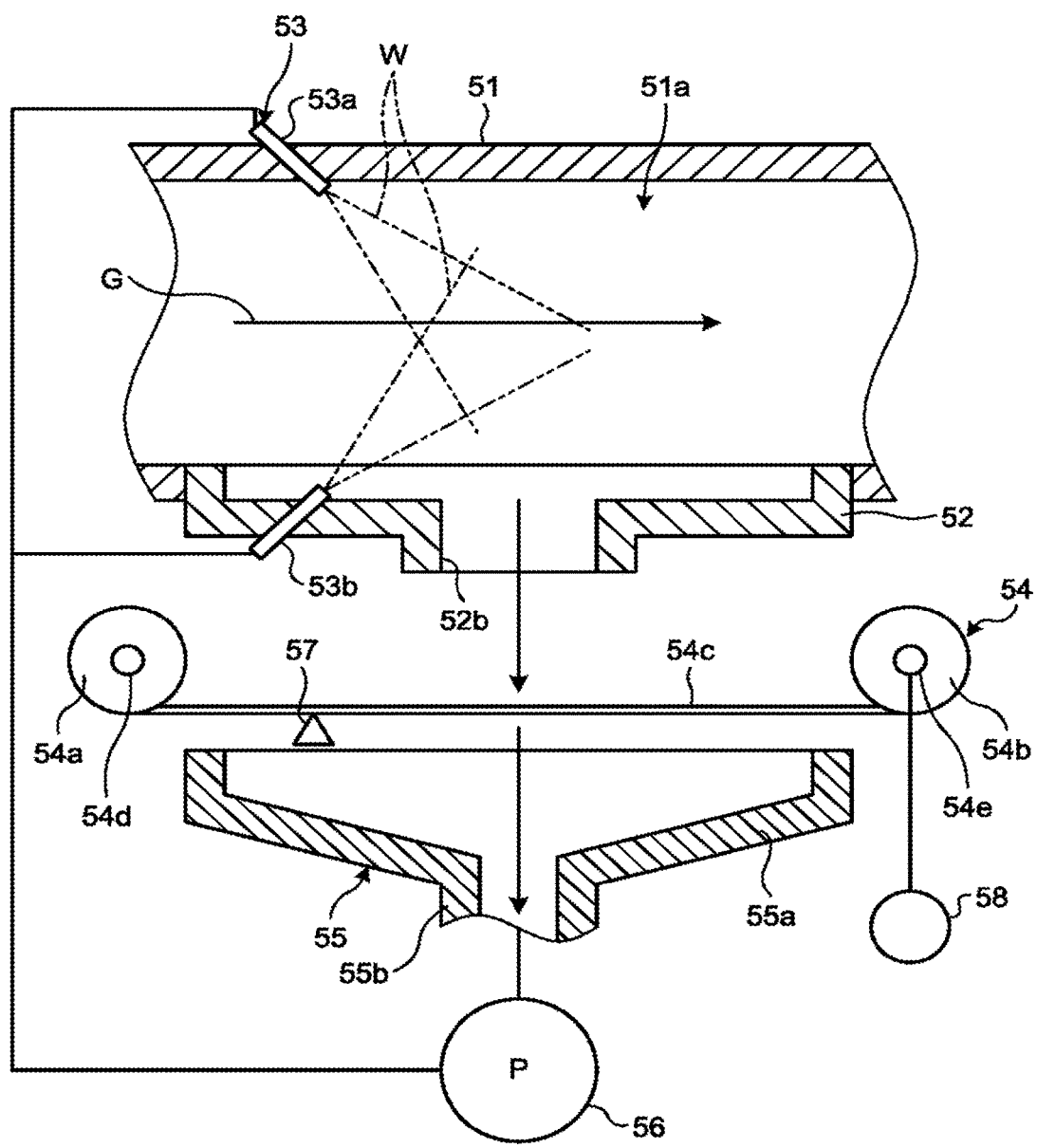
FIG. 7 is a cross-sectional view of a part of a mist, area according to a fifth embodiment.

Hereinafter, a fifth embodiment will be described with reference to FIG. 7. FIG. 7 is a cross-sectional view of a part of the mist area 41 according to the fifth embodiment. As illustrated in FIG. 7, the nozzles 53 of the fifth embodiment include the first and second nozzles 53a and 53b.

The first nozzle 53a of the fifth embodiment injects the mist of pure water W in a direction inclined to the downstream of the flow of the nitrogen gas G from the direction orthogonal to the flow of the nitrogen gas G in the first passage 51a. The downstream of the flow of the nitrogen gas G is directed from the first passage 51a to the outlet 31b of the manufacturing unit 21. In other words, the first nozzle 53a injects the mist of pure water W obliquely downward, that is, to the downstream side of the first passage 51a.

The second nozzle 53b injects the mist of pure water W in the direction inclined to the downstream of the flow of the nitrogen gas G from the direction orthogonal to the flow of the nitrogen gas G in the first passage 51a. In other words, the second nozzle 53b injects the mist of pure water W obliquely upward, that is, to the downstream side of the first passage 51a.

In the three-dimensional printer 10 of the fifth embodiment, the first and second nozzles 53a and 53b inject the mist of pure water W to the downstream of the flow of the nitrogen gas G in the first passage 51a. In other words, the first and second nozzles 53a and 53b inject the mist of pure water W to the downstream of the flow of the nitrogen gas G rather than the direction orthogonal to the flow of the nitrogen gas G. Thereby, the mist of pure water W injected from the first and second nozzles 53a and 53b is inhibited from reducing the flow rate of the nitrogen gas G.

The first to fifth embodiments have described the various nozzles 53, but a combination of the nozzles 53 of the embodiments may be provided in the mist area 41. For example, the mist area 41 may include the nozzles 53 of the second embodiment which face in multiple directions, the nozzle 53 of the fourth embodiment directed to the upstream of the flow of the nitrogen gas G in the first passage 51a, and the nozzle 53 of the fifth embodiment directed to the downstream of the flow of the nitrogen gas G in the first passage 51a. The mist area 41 may further Include the third nozzle 53c of the fourth embodiment directed to the downstream.

Figure 8:
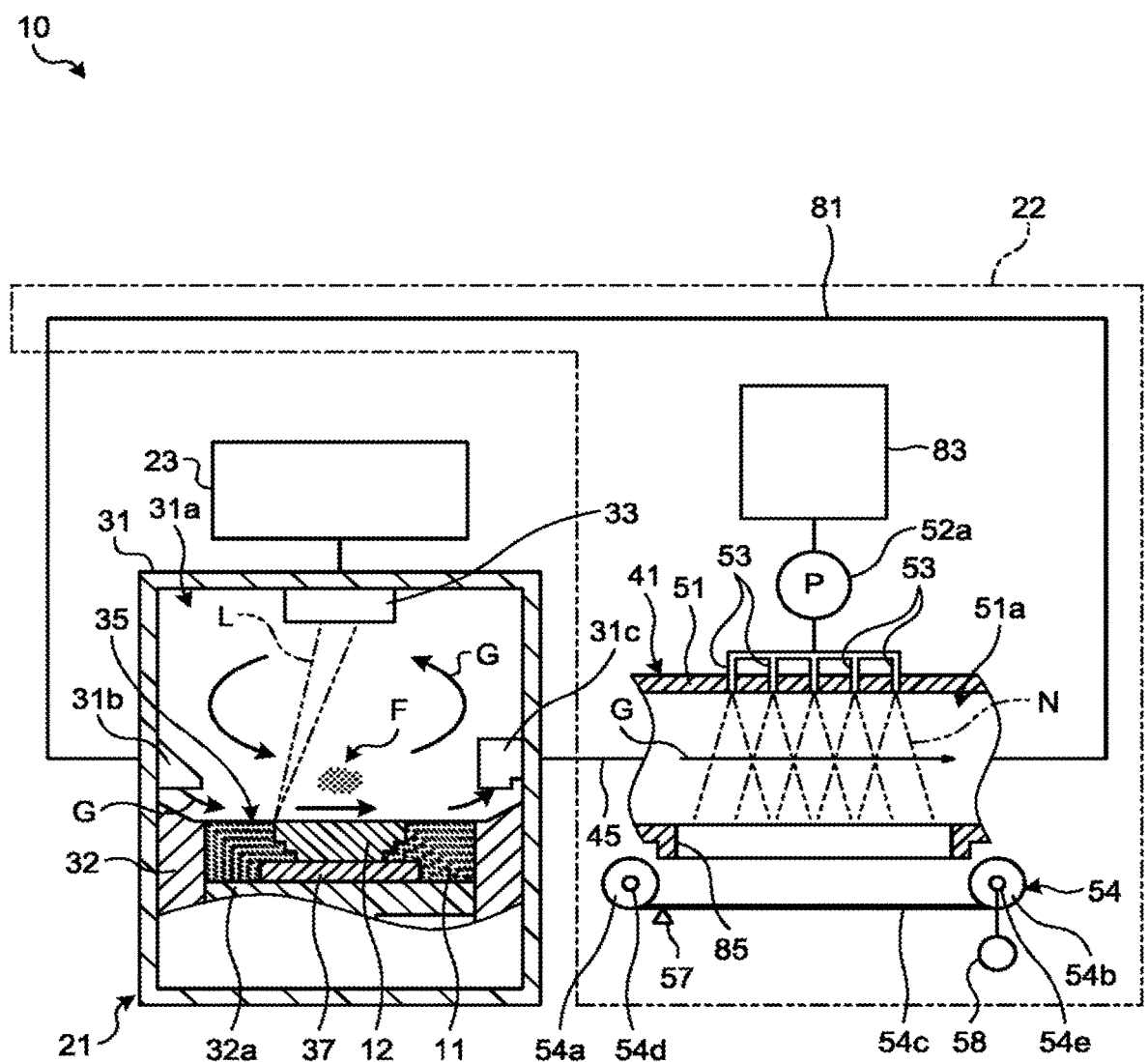
FIG. 8 is a schematic cross-sectional view of a three-dimensional printer according to a sixth embodiment.

Hereinafter, a sixth embodiment will be described with reference to FIG. 8. FIG. 8 is a schematic cross-sectional view of the three-dimensional printer 10 according to the sixth embodiment. As illustrated in FIG. 8, the fume collecting unit 22 of the sixth embodiment includes the mist area 41 and a conduit 81. The conduit 81 is an example of a liquid remover and a supplier.

As in the first embodiment, the nitrogen gas G discharged from the inlet 31c of the manufacturing unit 21 is sent to the mist area 41 through the first conduit 45. The mist area 41 of the sixth embodiment includes the first wall 51, the nozzles 53, the filter 54, the pump 56, and a tank 83.

The first wall 51 is provided with a discharger 85 instead of the receiver 52. The discharger 85 opens to the outside of the first wall 51 from, for example, the inner surface of the first passage 51a located at the lower position.

The nozzles 53 are provided in the first wall 51, opposing the discharger 85. For example, the nozzles 53 are disposed in a matrix form on the first wall 51 located at the upper position. The positions of the nozzles 53 are not limited thereto.

The nozzles 53 open to the first passage 51a and inject a mist of liquid nitrogen M toward the discharger 85. The liquid nitrogen N is an example of a liquid. The liquid nitrogen N is a liquefied nitrogen gas G. Thus, mist of the liquid nitrogen N is formed between the discharger 85 and the first wall 51 provided with the nozzles 53 in the first passage 51a.

The nitrogen gas G including the fume F passes through the mist of the liquid nitrogen N in the first passage 51a. In the mist area 41, the nitrogen gas G including the fume F discharged from the treatment chamber 31a of the manufacturing unit 21 contacts the mist of liquid nitrogen N.

In the mist area 41, the fume F in the nitrogen gas G is adsorbed to the particles of the mist of the liquid nitrogen N in the first passage 51a. The mist of liquid nitrogen N is injected from the nozzles 53 toward the discharger 85. The particles of the mist of liquid nitrogen N increase in weight, adsorbing the fume F. Thus, the particles of the mist of liquid nitrogen N fly downward to the discharger 85 while adsorbing the fume F. The liquid nitrogen N is discharged from the discharger 85 to the outside of the first passage 51a. The particles of the mist of liquid nitrogen N may fly in other directions. The liquid nitrogen N including the fume F mixed in the nitrogen gas G is discharged from the discharger 35 and removed from the nitrogen gas G.

The third part 54c of the filter 54 faces the discharger 85. The liquid nitrogen N including the fume F discharged from the discharger 85 adheres to the third part 54c of the filter 54 facing the discharger 85. The fume F in the liquid nitrogen N is captured by the third part 54c of the filter 54.

The liquid nitrogen N adhering to the filter 54 and the liquid nitrogen N passing through the filter 54 are gasified by volatilization. For example, the gasified nitrogen (volatilized liquid nitrogen N) returns from the discharger 85 to the first passage 51a and assimilates into the nitrogen gas G flowing in the first passage 51a.

The liquid nitrogen N is stored in the tank 83 and is supplied to the nozzles 53 by the pump 56. The liquid nitrogen N is not limited thereto and may be reused by the receiver 52, the collector 55, and the pump 56 as in the first embodiment.

The conduit 81 connects the mist area 41 and the outlet 31b of the manufacturing unit 21 to each other. The nitrogen gas G from which the fume F is removed in the mist area 41 flows toward the manufacturing unit 21 through the conduit 81.

The inner temperature of the conduit 81 is higher than the boiling point, of the liquid nitrogen N. Because of this, the liquid nitrogen N included in the nitrogen gas G evaporates while the nitrogen gas G flows through the conduit 81. That is, the liquefied nitrogen (the liquid nitrogen N) is removed from the nitrogen gas G in the conduit 81. The evaporated liquid nitrogen N assimilates into the nitrogen gas G.

The nitrogen gas G is supplied from the outlet 31b to the treatment chamber 31a through the conduit 81. The supplied nitrogen gas G 31a forms a nitrogen gas atmosphere in the treatment chamber. Thus, the nitrogen gas G, which forms the nitrogen gas atmosphere in the treatment chamber 31a of the manufacturing unit 21, has the fume F removed in the fume collecting unit 22, and is returned to the treatment chamber 31a.

In the three-dimensional printer 10 of the sixth embodiment, the liquid nitrogen N as a liquid to contact the nitrogen gas G is a liquefied nitrogen gas G. Thereby, at the time of the gasification of the liquid nitrogen N, the nitrogen gas G becomes mixed with a gas (a gasified liquid nitrogen N) having the same component as that of the nitrogen gas G. Thus, it is possible to suppress a gas having a different component from that of the nitrogen gas G from being supplied to the manufacturing unit 21. This can also eliminate the necessity of the part for removing the gas other than nitrogen, enabling the downsizing of the fume collecting unit 22.

In addition, the liquid nitrogen N is more volatile than the pure water W. Because of this, the liquefied nitrogen (the liquid nitrogen N) is volatilized and removed from the nitrogen gas G and assimilate into the nitrogen gas G in the conduit 81. This makes it easier to purify or remove the liquid nitrogen N. The liquid which is more volatile than the pure water W is not limited to the liquid nitrogen N and may be ammonia, alcohol, or a liquefied inert gas.

In the sixth embodiment, in the mist area 41 the liquid nitrogen N is injected from the nozzles 53 arranged in a matrix form, as in the first embodiment. However, the mist area 41 is not limited thereto and the liquid nitrogen N may be injected from multiple directions to the nitrogen gas G converged through the converger 73 as in, for example, the second embodiment. Further, in the mist area 41 the liquid nitrogen N may be injected to the convergence point P at which the nitrogen gas G converged by the discharge nozzle 75 gathers, as in the third embodiment. Further, in the mist area 41 the liquid nitrogen N may be injected to the upstream of the flow of the nitrogen gas G in the first passage 51a, as in the fourth embodiment. Further, in the mist area 41 the liquid nitrogen N may be injected toward the downstream of the flow of the nitrogen gas G in the first passage 51a, as in the fifth embodiment.

According to at least one of the above-described embodiments, contacting the gas including particles, the misty liquid including the particles becomes mixed with the gas and removed from the gas. Thereby, it is possible to further ensure the removal of the particles from the gas.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above-described embodiments, the fume F is removed from the pure water W and the liquid nitrogen N through the filter 54. However, the removal of the fume F is not limited thereto, and may be, for example, settled in a liquid or captured by a magnet for removal.

The invention claimed is:

1. An additive manufacturing apparatus comprising:
   a manufacturing unit which adds a layer upon a layer of a powdery material and melts or sinters the material in an inert gas atmosphere to manufacture an object;
   a particle remover which brings a mist of liquid into contact with the inert gas which includes particles and is discharged from the manufacturing unit, to remove the particles from the inert gas;
   a liquid remover which removes the liquid from the inert gas having passed through the particle remover; and
   a supplier which supplies the inert gas to the manufacturing unit.

2. The additive manufacturing apparatus according to claim 1,
   wherein the particle remover includes a receiver, an injector which injects the mist of the liquid toward the receiver, and a filter which captures the particles from the liquid including the particles and adhering to the receiver.

3. The additive manufacturing apparatus according to claim 2,
   wherein the receiver is provided with an opening from which the liquid including the particles is discharged, and
   the filter is positioned so that the liquid discharged from the opening passes through the filter.

4. The additive manufacturing apparatus according to claim 3,
   wherein the filter forms a first wound part, a second wound part, and a third part located between the first part and the second part, the third part through which the liquid discharged from the discharger passes, and
   the particle remover includes a sensor which detects a weight of the third part of the filter, and a conveyer which conveys the filter from the first part to the second part in accordance with the weight of the third part.

5. The additive manufacturing apparatus according to claim 2,
   wherein the particle remover further includes a liquid supplier which supplies the liquid filtered through the filter to the injector.

6. The additive manufacturing apparatus according to claim 1,
   wherein the liquid remover includes a heater which heats the liquid included in the inert gas.

7. The additive manufacturing apparatus according to claim 1,
   wherein the supplier removes, from the inert gas having passed through the liquid remover, a gas having a different component from that of the inert gas.

8. The additive manufacturing apparatus according to claim 1,
   wherein the liquid is the inert gas which is liquefied.

9. The additive manufacturing apparatus according to claim 8,
   wherein the inert gas is nitrogen.

10. The additive manufacturing apparatus according to claim 1, wherein the particle remover includes a duct which converges a flow of the inert gas, and an injector which is provided in the duct and injects the mist of the liquid to the inert gas from multiple directions.

11. The additive manufacturing apparatus according to claim 1,
wherein the particle remover is provided with a convergence passage through which a flow of the inert gas converges, and
the particle remover includes an injector which injects the mist of the liquid to an area including a position at which the inert gas having passed through the convergence passage gathers.

12. The additive manufacturing apparatus according to claim 1,
wherein the particle remover is provided with a passage through which the inert gas flows, and
the particle remover includes an injector which injects the mist of the liquid toward an upstream of a flow of the inert gas rather than a direction orthogonal to the flow of the inert gas in the passage.

13. The additive manufacturing apparatus according to claim 1,
wherein the particle remover is provided with a passage through which the inert gas flows, and
the particle remover includes an injector which injects the mist of the liquid toward a downstream of a flow of the inert gas rather than a direction orthogonal to the flow of the inert gas in the passage.

* * * * *